US00RE44731E

(19) United States
(12) Reissued Patent
Yum

(10) Patent Number: US RE44,731 E
(45) Date of Reissued Patent: Jan. 28, 2014

(54) APPARATUS, AND ASSOCIATED METHOD, FOR NOTIFYING A USER IN A RADIO COMMUNICATION SYSTEM OF A COMMERCIALLY-RELATED TRANSACTION

(75) Inventor: Sheung-Yin Yum, Coquitlam (CA)

(73) Assignee: Nokia Corporation, Espoo (FI)

(21) Appl. No.: 12/754,889

(22) Filed: Apr. 6, 2010

Related U.S. Patent Documents

Reissue of:
(64) Patent No.: 7,509,117
Issued: Mar. 24, 2009
Appl. No.: 10/161,156
Filed: May 31, 2002

(51) Int. Cl.
*H04M 11/00* (2006.01)
*H04Q 7/20* (2006.01)
*G06Q 30/00* (2012.01)
*H04B 7/00* (2006.01)

(52) U.S. Cl.
USPC ..... 455/406; 455/412.2; 455/466; 455/41.2; 705/14; 705/26

(58) Field of Classification Search
USPC ..... 455/406, 412.2, 41.2, 466; 705/14, 26
See application file for complete search history.

(56) References Cited

U.S. PATENT DOCUMENTS 6,038,292 A * 3/2000 Thomas ..... 379/88.06
6,067,529 A * 5/2000 Ray et al. ..... 705/24
6,529,723 B1 * 3/2003 Bentley ..... 455/405
6,529,725 B1 * 3/2003 Joao et al. ..... 455/406
6,532,446 B1 * 3/2003 King ..... 704/270.1
6,587,835 B1 * 7/2003 Treyz et al. ..... 705/26
6,647,272 B1 * 11/2003 Asikainen ..... 455/466
6,681,105 B1 * 1/2004 Balbi ..... 455/406
6,714,797 B1 * 3/2004 Rautila ..... 455/552.1
6,847,816 B1 * 1/2005 Sarradin ..... 455/407
6,925,155 B2 * 8/2005 Reynolds et al. ..... 379/88.05
6,925,307 B1 * 8/2005 Mamdani et al. ..... 455/466
6,934,529 B2 * 8/2005 Bagoren et al. ..... 455/406
6,944,464 B2 * 9/2005 Muranaga ..... 455/456.1
6,990,330 B2 * 1/2006 Veerepalli et al. ..... 455/406
6,996,409 B2 * 2/2006 Gopinath et al. ..... 455/466

(Continued)

FOREIGN PATENT DOCUMENTS

WO WO-02/35429 A1 5/2002

OTHER PUBLICATIONS

Ahli United Bank Launches SMS Alert Service for Credit Card Customers [online][retrieved Dec. 22, 2009] Retrieved from <URL: http://www.ameinfo.com/204429.html > 3 pages.

(Continued)

*Primary Examiner* — Lisa Hashem
(74) *Attorney, Agent, or Firm* — Alston & Bird LLP

(57) ABSTRACT

Apparatus, and an associated method, for facilitating notification of a user of a mobile station of a commercially-related transaction associated with the user. When a commercially-related transaction is effectuated, a report or other message indicative thereof, is generated and routed to a message generating center, such as a short message service center. Upon detection of the report, or other message, delivered thereto, a radio communication system message generator generates, and sends, a message to the mobile station. Apparatus at the mobile station detects delivery of the message thereto. And, a notifier notifies the user of the mobile station of indicia associated with the report of the occurrence of the commercially-related transaction.

33 Claims, 3 Drawing Sheets

(56) References Cited

U.S. PATENT DOCUMENTS

| | | | | |
|---|---|---|---|---|
| 7,068,149 | B2 | 6/2006 | Lee et al. | |
| 7,149,541 | B2 * | 12/2006 | Rautila | 455/552.1 |
| 7,155,199 | B2 * | 12/2006 | Zalewski et al. | 455/403 |
| 7,248,855 | B2 * | 7/2007 | Joyce et al. | 455/406 |
| 7,254,410 | B2 * | 8/2007 | Park | 455/466 |
| 8,060,429 | B2 * | 11/2011 | Titus et al. | 705/36 R |
| 2001/0007983 | A1 * | 7/2001 | Lee | 705/69 |
| 2001/0037315 | A1 * | 11/2001 | Saliba et al. | 705/70 |
| 2001/0042021 | A1 * | 11/2001 | Matsuo et al. | 705/26 |
| 2001/0056402 | A1 * | 12/2001 | Ahuja et al. | 705/43 |
| 2002/0023027 | A1 * | 2/2002 | Simonds | 705/26 |
| 2002/0025796 | A1 * | 2/2002 | Taylor et al. | 455/406 |
| 2002/0035539 | A1 | 3/2002 | O'Connell | |
| 2002/0046090 | A1 * | 4/2002 | Stewart | 705/14 |
| 2002/0059138 | A1 * | 5/2002 | Priest et al. | 705/39 |
| 2002/0111164 | A1 * | 8/2002 | Ritter | 455/426 |
| 2002/0133462 | A1 | 9/2002 | Shteyn | |
| 2002/0143634 | A1 * | 10/2002 | Kumar et al. | 705/18 |
| 2003/0059110 | A1 | 3/2003 | Wilt | |
| 2003/0166400 | A1 * | 9/2003 | Lucas | 455/425 |
| 2003/0191945 | A1 | 10/2003 | Keech | |
| 2004/0014462 | A1 * | 1/2004 | Surette | 455/418 |
| 2004/0049454 | A1 * | 3/2004 | Kanno et al. | 705/39 |
| 2004/0078327 | A1 * | 4/2004 | Frazier et al. | 705/40 |
| 2005/0017068 | A1 * | 1/2005 | Zalewski et al. | 235/380 |
| 2005/0086164 | A1 * | 4/2005 | Kim et al. | 705/40 |
| 2005/0102230 | A1 * | 5/2005 | Haidar | 705/40 |
| 2005/0176410 | A1 * | 8/2005 | Brooking et al. | 455/412.1 |
| 2006/0222154 | A1 * | 10/2006 | Naick et al. | 379/201.02 |
| 2007/0066310 | A1 * | 3/2007 | Haar et al. | 455/445 |
| 2007/0073597 | A1 * | 3/2007 | Grubbs | 705/26 |
| 2007/0270124 | A1 * | 11/2007 | Johnson et al. | 455/406 |
| 2008/0051122 | A1 * | 2/2008 | Fisher | 455/466 |
| 2008/0208762 | A1 * | 8/2008 | Arthur et al. | 705/79 |
| 2008/0288408 | A1 * | 11/2008 | Jacobsen | 705/50 |
| 2008/0294556 | A1 * | 11/2008 | Anderson | 705/44 |
| 2008/0311884 | A1 * | 12/2008 | Ala-Laurila et al. | 455/406 |
| 2009/0259590 | A1 * | 10/2009 | Carapelli | 705/44 |
| 2010/0159887 | A1 * | 6/2010 | Lewis | 455/412.2 |
| 2010/0174647 | A1 * | 7/2010 | Kowalchyk et al. | 705/44 |
| 2010/0191602 | A1 * | 7/2010 | Mikkelsen et al. | 705/14.64 |
| 2010/0198728 | A1 * | 8/2010 | Aabye et al. | 705/44 |
| 2010/0241495 | A1 * | 9/2010 | Maniyar et al. | 705/14.1 |
| 2011/0004532 | A1 * | 1/2011 | Yu | 705/26.41 |
| 2011/0022484 | A1 * | 1/2011 | Smith et al. | 705/17 |
| 2011/0035317 | A1 * | 2/2011 | Carlson et al. | 705/40 |
| 2011/0087596 | A1 * | 4/2011 | Dorsey | 705/44 |
| 2011/0264543 | A1 * | 10/2011 | Taveau et al. | 705/23 |
| 2012/0078732 | A1 * | 3/2012 | Heller | 705/14.73 |
| 2012/0290484 | A1 * | 11/2012 | Maher | 705/71 |
| 2013/0138568 | A1 * | 5/2013 | Dittmer | 705/44 |
| 2013/0151405 | A1 * | 6/2013 | Head et al. | 705/41 |
| 2013/0179342 | A1 * | 7/2013 | Clausen et al. | 705/41 |
| 2013/0185194 | A1 * | 7/2013 | Moore et al. | 705/39 |

OTHER PUBLICATIONS

Mandiri SMS FAQ [online][retrieved Dec. 22, 2009] Retrieved from <URL: http://www.bankmandiri.co.ie/english/article/faq-sb.aspx > 8 pages.

[online][retrieved Dec. 22, 2009] Retrieved from <URL: http://www.giftwithlove.com/vadodara/mobile_payment.htm > 3 pages.

* cited by examiner

APPARATUS, AND ASSOCIATED METHOD, FOR NOTIFYING A USER IN A RADIO COMMUNICATION SYSTEM OF A COMMERCIALLY-RELATED TRANSACTION

Matter enclosed in heavy brackets [ ] appears in the original patent but forms no part of this reissue specification; matter printed in italics indicates the additions made by reissue.

The present invention relates generally to a manner by which to alert a user of a mobile station of a commercially-related transaction associated with the user. More particularly, the present invention relates to apparatus, and an associated method, by which to send a message to the mobile station to notify the user of the occurrence of the commercially-related transaction. The commercially-related transaction is, for instance, a charge or debit to a charge account of the user or, for instance, issuance of a merchant receipt, evidencing purchase of a good. Near-immediate notification is provided to the user. Nonauthorized charges to the user's account are thereby promptly ascertainable by the user. And, sales receipts are electronically provided to the user, thereafter to be made available for review in a desired format.

BACKGROUND OF THE INVENTION

Operation of a communication system provides for the communication between spaced-apart locations. Communication stations positioned at the spaced-apart locations are connected by way of a communication channel. Data is communicated between the communication stations by way of the communication channel.

At least one of the communication stations forms a sending station at which data is sourced. And, at least one of the communication stations forms a receiving station. Data sourced at the sending station is communicated by way of the communication channel to the receiving station.

A radio communication system is an exemplary type of communication system. A radio system utilizes a radio link upon which to define the communication channels upon which data is communicated. The need otherwise to connect the communication stations by way of a wireline connection is obviated as radio links are instead utilized upon which to define the communication channels.

A type of radio communication system that has achieved significant levels of commercial implementation and usage is a cellular communication system. Telephonic communication of voice, as well as nonvoice, data is effectuable in a typical cellular communication system. Cellular communication systems have been installed throughout significant parts of the populated portions of the world. And, various cellular communication standards have been promulgated, setting forth the operational parameters of the various different cellular communication systems.

A cellular communication system includes a fixed, network part that forms the infrastructure of the system. The fixed network infrastructure includes fixed-site, base transceiver stations. The fixed-site, base transceiver stations are positioned at spaced-apart locations, and each base transceiver station defines an area, referred to as a cell. The network infrastructure of the cellular communication system is coupled to a core network, such as a packet data backbone or a public-switched, telephonic network (PSTN). Communication devices, such as computer servers, telephonic stations, etc., are connected to, or form portions of, the core network.

Telephonic communications are effectuated in a cellular communication system, typically, through utilization of a mobile station. A mobile station is a radio transceiver, typically of dimensions to permit its carriage by a user. Usage of the cellular communication system through which to communicate is typically permitted pursuant to purchase of a service subscription for service to communicate therethrough. Users are sometimes referred to as being subscribers and communicate telephonically through operation of a mobile station.

Significant segments of the population in which cellular communication systems have been installed subscribe for cellular communication services. And, as cellular communication systems increasingly are constructed to provide for packet-based communications, additional types of communication services are becoming available therein.

For instance, short message service (SMS) and GPRS (General Packet Radio Service) messaging are both representative of packet-based messaging services available in certain cellular communication systems. Analogous, packet-based messaging services are available in other types of cellular communication systems, such as, for example, EMS and MMS messaging services to effectuate packet-based messaging. Mobile stations constructed to be operable in various ones of such cellular communication systems that provide for the messaging services are able to receive, operate upon, and display in a desired manner, such messages.

Asymmetric communication of such messages, such as by way of push messaging, is generally available in cellular communication systems that provide for the package-based messaging services.

Full advantage has not, however, yet been made of new communication possibilities available through the use of messaging services. For instance, reporting functions, reporting upon the occurrence of commercially-related transactions associated with a user, or the account of a user, generally do not make use of messaging services.

For instance, charges accruing to a charge or debit account of the user are conventionally reported to the user, in written form, by conventional mail procedures. One who maintains a charge or debit account, generally, receives monthly, or other, statements reporting on charges and debits made to the account during a preceding month, or other billing interval. Unauthorized use of the charge or debit account is thereby not regularly made known until the written statement is received and reviewed. And, while on-line access to the account summary permits more-immediate access to statement reports, such accessing of the on-line statements requires that the cardholder take the steps to review the on-line statement.

Also, conventionally, receipts evidencing purchase of a good or service are conventionally provided in printed form. The receipts are generally of a non-standardized format and also are easily misplaced, once delivered.

Any manner by which to improve upon reporting of commercially-related transactions, such as reporting on charges to a charge account or delivery of a receipt evidencing purchase of a good or service, through the use of a messaging service would therefore be advantageous.

It is in light of this background information related to messaging services that the significant improvements of the present invention have evolved.

SUMMARY OF THE INVENTION

The present invention, accordingly, advantageously provides apparatus, and an associated method, by which to alert a user of a mobile station of a commercially-related transaction associated with the user.

Through operation of an embodiment of the present invention, a manner is provided by which to send a message to the mobile station to notify the user of the occurrence of the commercially-related transaction.

The commercially-related transaction is any of a wide range of different types of transactions. For instance, the commercially-related transaction is a charge, or a debit, to a charge account of the user. And, the commercially-related transaction is, for instance, the issuance of a merchant receipt evidencing, e.g., the purchase of a good.

Sending of the message to notify the user of the occurrence of the commercially-related transaction provides the user with near-immediate notification of the occurrence of the transaction. When the occurrence of a charge or debit to a charge account of the user is unauthorized, the user is able immediately to take corrective action. And, when a merchant receipt is electronically provided to the mobile station, the user is able also quickly to determine the accuracy of the receipt as well as further to provide a manner by which to obtain the merchant receipt information in a standardized format.

In one aspect of the present invention, an account manager, a third party, manages the charge account associated with a user. The user also maintains a subscription for service in a cellular, or other radio, communication system. Or, the user is at least able to receive data messages at a mobile station operable in a radio communication system. The account manager receives indications, generated in conventional manner, that identify the transactions, e.g., both debits and credits, made to the account of the user. When the account manager is informed of the transaction charged to the account of the user, the account manager, in turn, sends a message to a radio communication system messaging center upon notification of the transaction to the charge account. The radio communication system messaging center, in turn, generates a radio air interface-formatted message for communication to the mobile station. Upon delivery at the mobile station, the message is displayed, thereby to notify the user of the mobile station of the transaction to the user's charge account. If the charged transaction is authorized, the user is able to take corrective action.

Because the account manager forwards an indication of the transaction to the radio communication system messaging service center immediately upon being informed of the transaction, and the radio communication system message center, in turn generates the message for communication to the mobile station also immediately, the user of the mobile station is notified of the transaction in a near-instantaneous manner.

In another aspect of the present invention, each time in which a merchant transaction is generated, the merchant generates a transaction report indicating the merchant transaction. The merchant transaction is, for instance, a transaction related to the sale of a good or service or for the return for crediting thereof. When the transaction is effectuated, the merchant generates an electronic report, reporting on the transaction. The report is forwarded to a radio communication system messaging center, such as an SMS service center. Upon detection of the report at the service center, the radio communication system messaging center, in turn, generates a message for communication to the mobile station of the user, reporting on the transaction. The user of the mobile station might well be carrying the mobile station when the transaction with the merchant is effectuated and, therefore, also when the report is generated and sent by the radio communication system messaging center. Because the receipt evidencing the merchant transaction is in electronic form, the hard copy of the merchant receipt is not susceptible to being misplaced. And, because the merchant receipt is in electronic form, the informational content thereof is displayable in any selected format. Merchant receipts evidencing transactions at any of many different merchants are thereby formatable in a common format. And, additional indexing and sorting can be performed upon the merchant receipts.

In another aspect of the present invention, network apparatus is provided for a message generating center to facilitate notification to a user of the occurrence of a commercially-related transaction. The network apparatus receives reports generated by an account manager, such as a merchant or a charge account manager. And, responsive to reports delivered thereto, the network apparatus generates a radio communication system message for communication to a mobile station. The message includes indicia associated with the report provided to the message generating center.

In another aspect of the present invention, mobile-station apparatus is provided. The mobile-station apparatus operates to detect delivery of a reporting message, reporting on a commercially-related transaction, associated with the user of the mobile station. The message forms a notification, notifying the user of the mobile station of the occurrence of the commercially-related transaction. The message is displayable in any desired format. Thereby, reports generated by different agents are displayed pursuant to a common format, if desired.

In these and other aspects, therefore, apparatus, and an associated method, is provided for a radio communication system. The radio communication system has a network part to which at least a first commercially-related transaction station is coupled. And, the radio communication system further has a mobile station operable by a user at least to receive data communicated thereto. Network apparatus facilitates electronic notification to the user of a commercially-related transaction identified by the commercially-related transaction statement. A message-center detector is coupled to the network part. The message-center detector detects a transaction-station-generated message generated by the commercially-related transaction associated with the user. A message-center message generator is coupled to the message-center detector. The message-center message generator generates a transaction-related message for communication to the mobile station.

A more complete appreciation of the present invention and to the scope thereof can be obtained from the accompanying drawings that are briefly summarized below, the following detailed description of the presently-preferred embodiments of the invention, and the appended claims.

DETAILED DESCRIPTION

Figure 1:
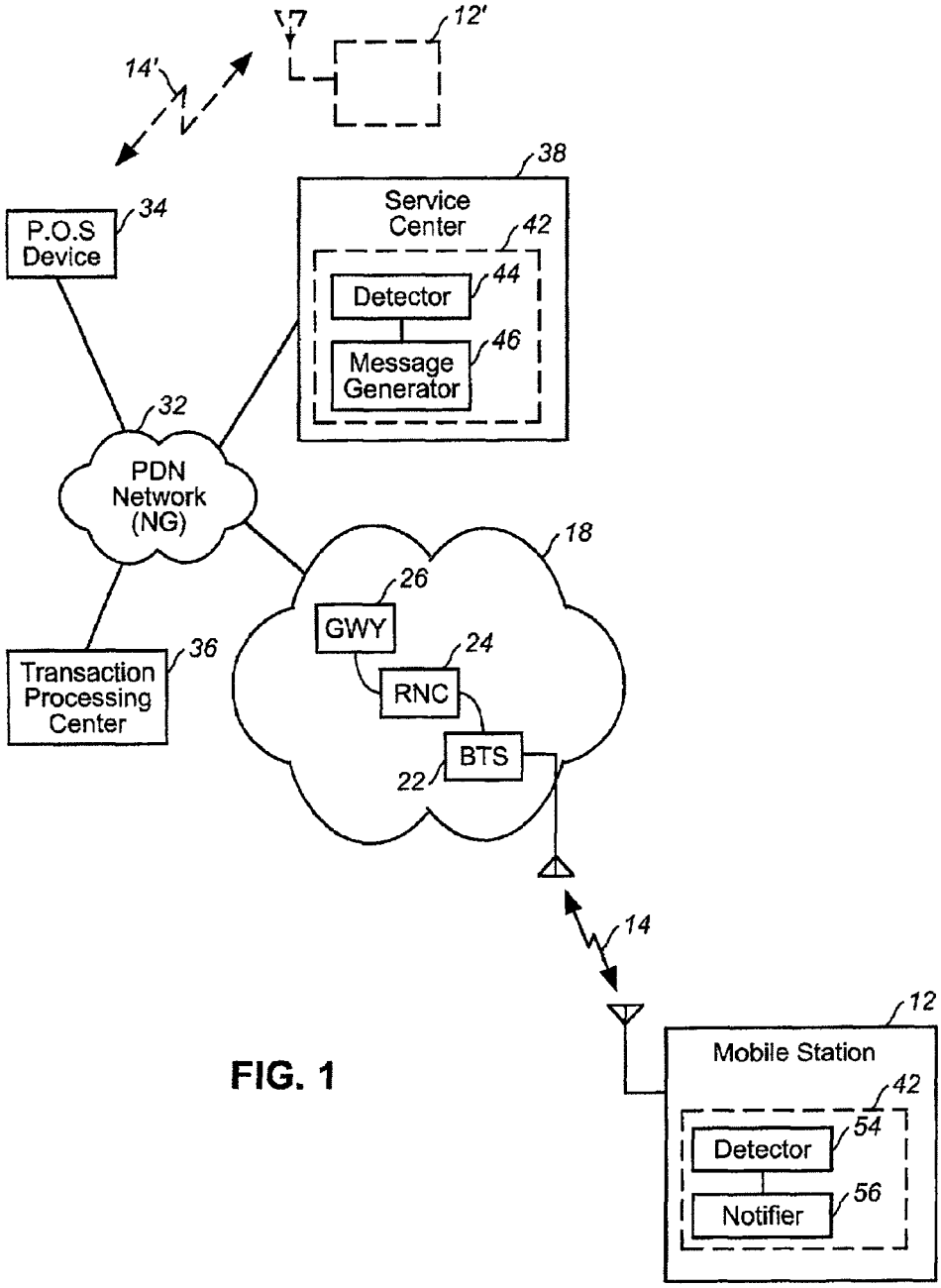
FIG. 1 illustrates a functional block diagram of a radio communication system in which an embodiment of the present invention is operable.

Referring first to FIG. 1, a radio communication system, shown generally at 10, provides for radio communications with mobile stations, of which the mobile station 12 is representative. In the exemplary implementation, the radio communication system includes a radio part that operates pursuant to the GSM/GPRS (global system for mobile communications/general packet radio service) having EDGE (enhanced data for GSM evolution) capabilities, as set forth in the operational specification therefor. And, portions of the network part of the radio communication system are operable pursuant to a next-generation (NG) communication scheme.

While the following description shall describe operation of an embodiment of the present invention with respect to its exemplary implementation in a communication system formed of a GSM system and an NG system, the teachings of the present invention are analogously applicable in other types of communication systems and arrangements. And, the communication system 10 is also representative of such other types of communication systems.

During operation of the communication system, data is communicated with the mobile station by way of radio channels defined upon radio links 14. Data communicated to the mobile station is communicated upon forward-link channels defined upon the radio link. And, data originated at the mobile station for communication to the network part of the communication system is communicated upon reverse-link channels defined upon the radio link.

The network part of the communication system includes a radio access network (RAN) 18 that forms the infrastructure of the radio part of the communication system. The radio access network includes base transceiver stations (BTSs) of which the base transceiver station 22 is representative. The base transceiver station transceives communication signals containing data that is communicated upon the radio link 14 to and from the mobile station. The radio access network here also is shown to include a radio network controller (RNC) 24 that operates to control operations at the radio access network. And, the radio access network further includes a gateway (GWY) 26 that connects the radio access network to a core network 32, here forming a NG (next generation) packet data network. In another implementation, the network 32 forms a circuit-switched network, such as a public-switched, telephonic network (PSTN).

Devices are connected to the packet data network in conventional manner. Here, the devices shown to be coupled to the packet data network include a point of sale (POS) device 34, a commercial transaction processing center 36, and a message generating center, here an SMS (short message service) center 38. Other devices, and types of devices, are analogously also connectible to the network 32.

The point of sale device 34 is representative of any of many various types of merchant registry and reporting devices. In one implementation, the point of service device includes, or forms, a charge-authorization request device that requests charge account authorizations for the purchase, or return, of goods or services. When a charge to an account is requested for the purchase of goods or services at a merchant, the charge card, or other indicia associated therewith, is entered at the point of service device. A request for charge authorization is generated by the point of service device.

The request is routed through the network 32 and delivered to the transaction processing center 36. The transaction processing center is operated by a third-party account manager, or is otherwise associated with the charge account for which the authorization for the transaction is being requested. In conventional manner, the processing center authorizes, if appropriate, the charge authorization and returns the authorization to the point of service device. The merchant at the point of service device, upon receiving authorization for the charge, or debit, to the charge account, completes the transaction.

The authorization generated at the processing center responsive to the inquiry is also forwarded to the message generating center 38. Or, a separate message is generated at the processing center and routed to the message generating center reporting on the authorization of the transaction.

The message generating center 38 includes an apparatus, shown generally at 42, of an embodiment of the present invention. The apparatus includes a detector 44 operable to detect the authorization, or other indication generated by the processing center. The detector is coupled to a radio communication system message generator 46. The message generator 46 operates to generate a message, here a SMS (short message service) message that is routed through the packet data network and the network part of the radio access network and thereafter communicated upon forward link channels defined upon the radio link 14 to the mobile station.

The mobile station 12 also includes apparatus 42 of an embodiment of the present invention. The elements of the apparatus 42 positioned at the mobile station are also functionally represented and can be implemented in any selected manner. In the exemplary implementation, the elements of the apparatus 42 are implemented partly, or entirely, as algorithms executable by processing circuitry. In other implementations, the elements of the apparatus 42 are implemented in other manners.

The apparatus 42 positioned at the mobile station includes a radio communication system message detector 54. The detector 54 operates to detect delivery at the mobile station of the message generated by the message generator 38 of the message generating center 38. The apparatus 42 further includes a notifier 56 coupled to the detector 54. When the detector detects delivery of the message generated by the message generator 38 at the mobile station, indicia associated with the message, here, the informational content thereof, is provided to the notifier. The notifier generates a notification, such as by way of a user interface, of the indicia associated with the message. Thereby, the user of the mobile station is notified in a near-instantaneous manner, of the transaction entered at the point of service device. If the transaction is unauthorized, the user is able to take immediate action. The need otherwise to wait for a conventional, written report to be mailed to the user is obviated. And, the need otherwise for the user to access an internet location to obtain an updated listing of the transactions associated with the charge account is also obviated. Automatic delivery of the message, and subsequent notification, is instead made.

In another implementation, operation of an embodiment of the present invention provides a user of a mobile station with a receipt evidencing a commercial transaction, such as the purchase of goods or services. The point of service device is, accordingly, also representative of a merchant processing device such as a cash register. The cash register, or other merchant device, generates an electronic receipt evidencing the merchant transaction with the user of the mobile station.

In one implementation, the electronic receipt is routed to the message generating center 38, detected thereat by the detector 44 of the apparatus 42. A radio communication system message is generated by the message generator 46, thereafter routed through the network 32 and radio access network 18 to be communicated to the mobile station. The user of the mobile station is thereby provided with an electronic receipt evidencing the merchant transaction.

In another implementation, the elements of the apparatus 42 are embodied within the point of service device, and a localized radio link, here represented by the arrow 14' with the mobile station, here represented at 12'. The localized radio link forms, for instance a Bluetooth connection, and both of the point of service device and the mobile station include Bluetooth devices to permit effectuation of such delivery of the receipt to the mobile station.

Because the receipt is delivered to the user of the mobile station in electronic form, the receipt is not usually susceptible to loss. And, the user of the mobile station is able to format all of the receipts, evidencing merchant transactions with any of many merchants according to a common, selected format. Additionally, electronic sorting and searching is permitted of the receipts.

Figure 2:
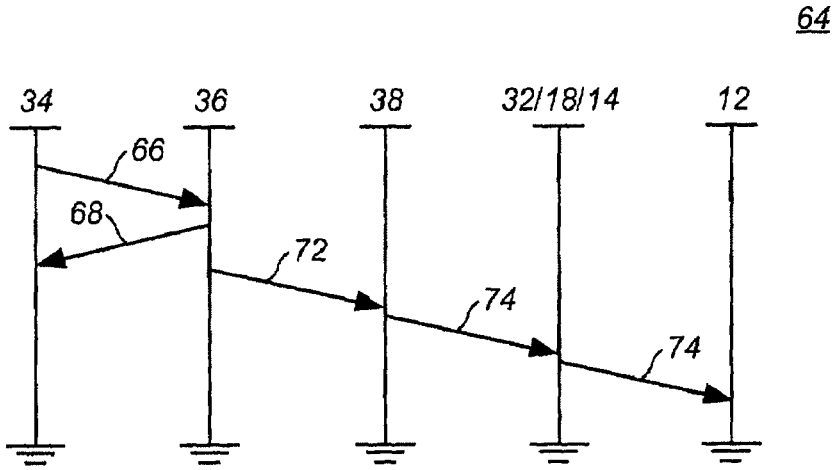
FIG. 2 illustrates a message sequence diagram representative of signaling generated during operation of an embodiment of the present invention.

FIG. 2 illustrates a message sequence diagram, shown generally at 64, that represents signaling generated during exemplary operation of the communication system 10, and the embodiment of the present invention operable therein. The message sequence diagram is representative of generation of a message notifying a user of a mobile station of activity in a charge account maintained by the user.

First, and as indicated by the segment 66, a charge authorization request is generated by the point of service device 34, for communication to a commercially-related transaction processing center 36. The renter is operated by a third-party. A determination is made at the processing center whether the charge-authorization request is granted, a message is generated and routed, as indicated by the segment 72, to the message generating center 38.

Delivery of the message at the message generating center is detected. And, responsive thereto, a radio communication system message, such as an SMS message, is generated and routed, as indicated by the segments 74 through the packet data network, the radio access network 18, and the radio link 14, and delivered to the mobile station 12. Once delivered to the mobile station, indicia associated with the message is provided to the user, such as by way of a visual display thereof on a user interface display.

Figure 3:
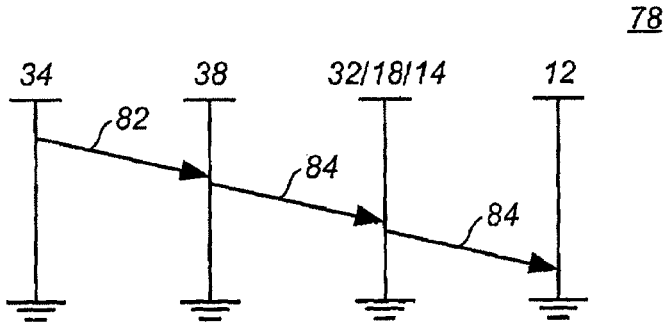
FIG. 3 illustrates another message sequence diagram, also representative of signaling generated during operation of an embodiment of the present invention.

FIG. 3 illustrates a message sequence diagram, shown generally at 78, also representative of signaling generated during operation of the communication system 10 having an embodiment of the present invention operable therein. Here, the signaling is representative of a manner by which a user of a mobile station is provided with information associated with a merchant transaction, such as a purchase or sale of a good or service by the user of the mobile station. First, and as indicated by the segment 78, when the transaction occurs, a point of service device, such as a cash register, operated by the merchant generates a report evidencing the effectuation of the merchant transaction. The report is routed through a packet data network and delivered to the message generating service center 38. Once delivery of the report is detected at the message generating service center, a radio communication system message is generated and sent, indicated by the segment 84, by way of the network 32, the radio access network 18, and the radio link 14, for delivery to the mobile station 12. When delivered at the mobile station, the message is detected, and a notification is generated indicating information associated with the merchant receipt. The information is both sortable and displayable in any selected format.

Figure 4:
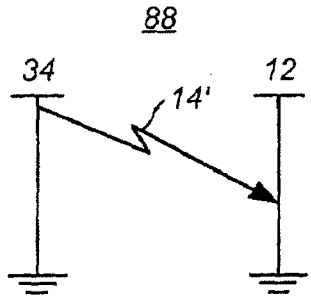
FIG. 4 illustrates a message sequence diagram, similar to those shown in FIGS. 2-3, but here representative of the signaling generated during an alternate embodiment of the present invention.

FIG. 4 illustrates another message sequence diagram, shown generally at 88, representative of alternate operation of an embodiment of the present invention. Here, again, signaling generated to provide a user of a mobile station with a report evidencing effectuation of a merchant transaction. In contrast to the signaling shown with respect to the message sequence diagram shown in FIG. 3, here, the signaling utilizes a localized radio link.

When the merchant transaction is effectuated, the point of service device 34, such as a cash register, generates a signal that is sent pursuant to a localized radio communication system, such as a Bluetooth system, directly to the mobile station. The mobile station includes appropriate circuitry for detecting the localized radio signal generated by the point of service device. Once the signal is detected at the mobile station, a notification is generated, displayed if appropriate, and otherwise provided to the user of the mobile station to provide the user of the mobile station with a report, in electronic form, of the merchant transaction.

Figure 5:
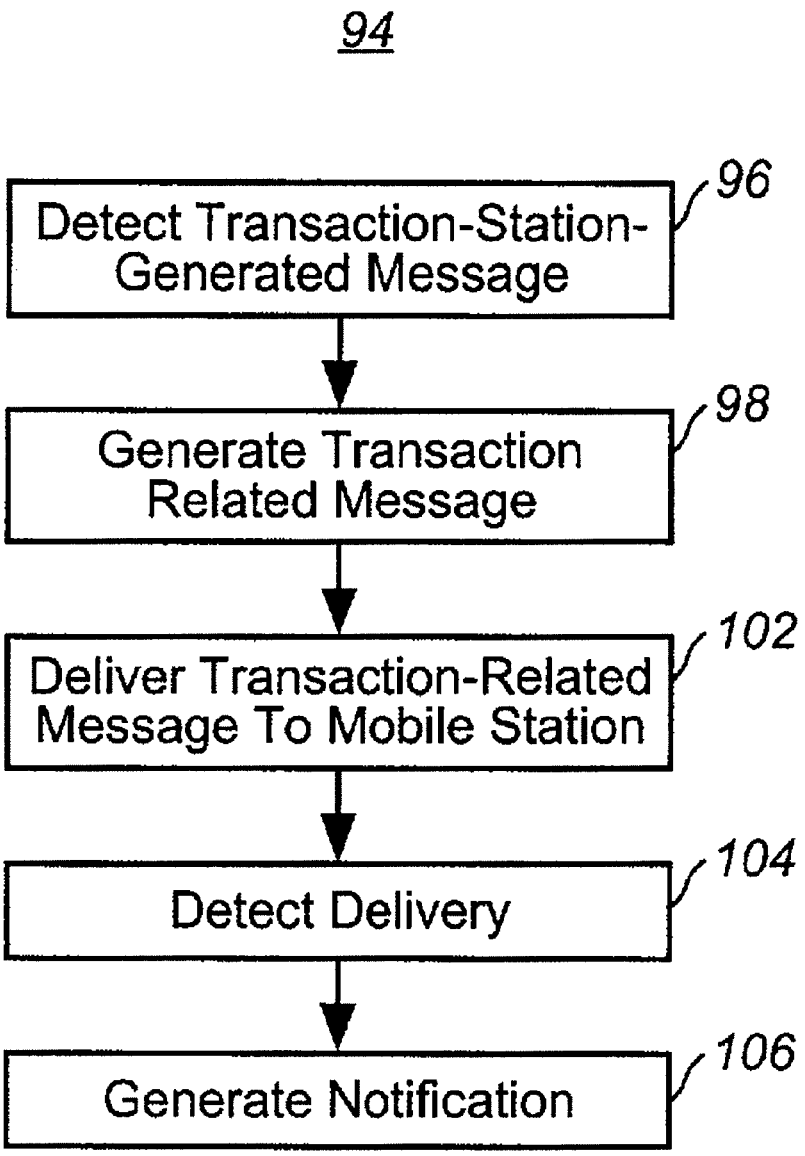
FIG. 5 illustrates a method flow diagram listing the method of operation of an embodiment of the present invention.

FIG. 5 illustrates a method shown generally at 94 of the method of operation of an embodiment of the present invention. The method facilitates electronic notification to a user of a commercially-related transaction identified by a commercially-related transaction station operable as part of a radio communication system.

First, and as indicated by the block 96, a transaction-station-generated message generated by a commercially-related transaction station, is detected. The message regards a commercially-related transaction associated with the user.

Then, and as indicated by the block 98, a transaction related message is generated for communication to a mobile station of the detection of the transaction-station-generated message.

In an exemplary implementation, the method further comprises the operations, indicated by the block 102, of delivering the transaction-related message to the mobile station, detecting, as indicated by the block 104, delivery of the transaction-related message at the mobile station. And, as indicated by the block 106, the method further comprises the operation of generating a notification to notify the user of the transaction-related message, thereby to notify the user therewith of the commercially-related transaction.

Thereby, a manner is provided by which to alert a user of the mobile station of a commercially-related transaction associated with the user.

The previous descriptions are of preferred examples for implementing the invention, and the scope of the invention should not necessarily be limited by this description. The scope of the present invention is defined by the following claims:

I claim:

1. An apparatus, comprising:

a merchant transaction station which generates an electronic receipt evidencing a merchant transaction performed at the merchant transaction station, the electronic receipt to be available at a mobile station operable by a user at least to receive data communicated thereto;

a message-center detector coupled to the merchant transaction station, said message-center detector configured to detect a transaction-station-generated message generated by the merchant transaction station regarding a merchant transaction associated with the user, the transaction-station-generated message comprises data indicating a financial cost associated with the merchant transaction which is included in the electronic receipt; and

*processing circuitry comprising* a message-center message generator coupled to said message-center detector, said message-center message generator configured to generate, in response to detection, by the message-center detector of the transaction-station-generated message, a transaction-related message for communication to the mobile station, the transaction-related message, once communicated to the mobile station, available thereat as the electronic receipt to the user.

2. The apparatus of claim 1 wherein the mobile station forms part of a radio communication system comprising a cellular radio communication system operable pursuant to a selected operating protocol that defines a messaging service and wherein the transaction-related message generated by said message-center message generator conforms to the messaging service defined by the selected operating protocol.

3. The apparatus of claim 2 wherein the messaging service defined by the selected operating protocol comprises a short message service and wherein the transaction-related message generated by said message-center message generator comprises a short message service-formatted message.

4. The apparatus of claim 1 wherein the merchant transaction comprises one of a purchase of a good, a purchase of a service, a credit corresponding to a returned good, and a credit corresponding to an un-provided service.

5. The apparatus of claim 1 wherein the message generated by the merchant transaction station is generated within a first selected time subsequent to occurrence of the merchant transaction and wherein said message-center message generator generates the transaction-related message within a second selected time period subsequent to detection by said message-center detector of the transaction-station-generated message.

6. The apparatus of claim 1 wherein the message-center message generator comprises a push message generator and wherein the transaction-related message comprises a push message.

7. The apparatus of claim 1 further comprising:

a transaction-related message detector embodied at the mobile station for detecting reception at the mobile station of the transaction-related message generated by said message-center message generator; and a notifier coupled to said transaction-related message detector, said notifier for generating a notification to notify the user of the transaction-related message, and thereby for notifying the user with the electronic receipt of the merchant transaction.

8. The apparatus of claim 1, further comprising:

an authorization station configured to receive indication of the merchant transaction and authorize a payment relating to the merchant transaction.

9. The apparatus of claim 8, wherein the authorization of the merchant transaction evidences a future third-party payment transaction made by a third party on behalf of a transaction account of the user.

10. The apparatus of claim 9, wherein the authorization station comprises a third-party transaction reporting station, which manages the transaction account.

11. The apparatus of claim 8, wherein the merchant transaction station comprises the authorization station.

12. The apparatus of claim 1, wherein the merchant transaction station generates the electronic receipt in response to the merchant transaction.

13. The apparatus of claim 1, wherein the mobile station is configured to format the electronic receipt according to a predetermined format that conforms to one or more other electronic receipts.

14. The apparatus of claim 1, wherein the merchant transaction comprises an exchange of financial resources between the user and the merchant transaction station.

15. An apparatus comprising:

a merchant transaction station which generates an electronic receipt evidencing an authorization of a merchant transaction performed at the merchant transaction station, the electronic receipt to be available at a mobile station operable by a user at least to receive data communicated thereto;

a message-center detector coupled to an authorization station, said message-center detector is configured to detect an authorization-station-generated message generated by the authorization station regarding an authorization of a merchant transaction associated with the user, the authorization-station-generated message comprises data indicating a financial cost associated with the merchant transaction which is also included in the electronic receipt; and

*processing circuitry comprising* a message-center message generator coupled to said message-center detector, said message-center message generator is configured to generate a transaction-related message for communication to the mobile station in response to message-center detector detecting the authorization-station-generated message, the transaction-related message, once communicated to the mobile station, available thereat as the electronic receipt to the user.

16. The apparatus of claim 15 wherein the mobile station forms part of a radio communication system comprising a cellular radio communication system operable pursuant to a selected operating protocol that defines a messaging service and wherein the transaction-related message generated by said message-center message generator conforms to the messaging service defined by the selected operating protocol.

17. The apparatus of claim 16 wherein the messaging service defined by the selected operating protocol comprises a short message service and wherein the transaction-related message generated by said message-center message generator comprises a short message service-formatted message.

18. The apparatus of claim 15 wherein the authorization of the merchant transaction evidences a future third-party payment transaction made by a third party on behalf of a transaction account of the user, wherein the authorization station comprises a third-party transaction reporting station, and wherein the authorization-station-generated message that said message-center detector detects further comprises a message reporting on a transaction associated with the transaction account of the user.

19. The apparatus of claim 18 wherein the transaction account of the user comprises a charge account of the user and wherein the authorization-station-generated message that said message center detector detects further comprises a message reporting on a charge-account transaction associated with the charge account of the user.

20. The apparatus of claim 19 wherein the charge account of the user comprises a credit account and wherein the authorization-station-generated message that said message-center detector detects further comprises a message reporting on a credit-account transaction associated with the credit account associated with the user.

21. The apparatus of claim 19 wherein the charge account of the user comprises a debit account and wherein the authorization-station-generated message that said message-center detector detects further comprises a message reporting on a debit account transaction associated with the debit account associated with the user.

22. The apparatus of claim 15 further comprising:

a transaction-related message detector embodied at the mobile station for detecting reception at the mobile station of the transaction-related message generated by said message-center message generator; and a notifier coupled to said transaction-related message detector, said notifier for generating a notification to notify the user of the transaction-related message, and thereby for notifying the user with the electronic receipt of the authorization of the merchant transaction.

23. The apparatus of claim 15, wherein the merchant transaction comprises an exchange of financial resources between the user and the merchant transaction station.

24. An apparatus comprising:

a merchant transaction station which generates an electronic receipt evidencing an authorization of a merchant transaction performed at the merchant transaction station, the electronic receipt available at a mobile station operable by a user at least to receive data communicated thereto; a transaction-related message detector configured to detect reception at the mobile station of a transaction-related message generated at a network part of a radio communication system, the transaction-related message comprises data indicating a financial cost associated with the merchant transaction which is included in the electronic receipt evidencing the authorization of the merchant transaction;

*processing circuitry comprising* a notifier coupled to said transaction-related message detector, said notifier is configured to generate a notification to notify the user of the transaction-related message, and thereby to notify the user of the authorization of the merchant transaction; and wherein the merchant transaction station generates a transaction-station-generated message pertaining to the authorization of the merchant transaction associated with the user which is detected by a message-center detector at the network part, and wherein the transaction-related message detector, is configured to receive a transaction-related message generated by a message-center message generator at the network part, the transaction-related message indicative of the electronic receipt, the transaction-related message is generated in response to detection, by the message-center detector of the transaction-station-generated message.

25. The apparatus of claim 24, wherein the merchant transaction comprises an exchange of financial resources between the user and the merchant transaction station.

*26. A method comprising facilitating access to at least one interface to allow access to a service center via at least one network, the service center comprising processing circuitry configured to perform at least:*

*routing, via the service center, an electronic receipt evidencing a merchant transaction performed at a merchant transaction station, the electronic receipt to be available at a mobile station operable by a user at least to receive data communicated thereto, the routing including;*

*detecting, at the service center, a transaction-station-generated message generated by the merchant transaction station regarding a merchant transaction associated with the user, the transaction-station-generated message comprising data indicating a financial cost associated with the merchant transaction which is included in the electronic receipt; and*

*generating, in response to detecting the transaction-station-generated message at the service center, a transaction-related message for communication to a mobile station, the transaction-related message, once communicated to the mobile station, available thereat as the electronic receipt to the user.*

*27. The method of claim 26, wherein detecting the transaction-station-generated message comprises detecting the transaction-station-generated message at a message-center detector of the service center, and wherein generating the transaction-related message comprises generating the transaction-related message in response to detection of the transaction-station-generated message by the message-center detector.*

*28. The method of claim 26, wherein generating the transaction-related message comprises generating the transaction-related message at a message-center message generator of the service center, the message-center message generator being in communication with a message-center detector to receive an indication of detection of the transaction-station-generated message from the message-center detector in response to detection of the transaction-station-generated message by the message-center detector.*

*29. A method comprising facilitating access to at least one interface to allow access to a service center via at least one network, the service center comprising processing circuitry configured to perform at least:*

*routing, via the service center, an electronic receipt evidencing a merchant transaction performed at a merchant transaction station, the electronic receipt to be available at a mobile station operable by a user at least to receive data communicated thereto, the routing including;*

*detecting, at the service center, an authorization-station-generated message generated by an authorization station regarding authorization of a merchant transaction associated with the user, the authorization-station-generated message comprising data indicating a financial cost associated with the merchant transaction which is included in the electronic receipt; and*

*generating, in response to detecting the authorization-station-generated message at the service center, a transaction-related message for communication to a mobile station, the transaction-related message, once communicated to the mobile station, available thereat as the electronic receipt to the user.*

*30. The method of claim 29, wherein detecting the authorization-station-generated message comprises detecting the authorization-station-generated message at a message-center detector of the service center, and wherein generating the transaction-related message comprises generating the transaction-related message in response to detection of the authorization-station-generated message by the message-center detector.*

*31. The method of claim 30, wherein generating the transaction-related message comprises generating the transaction-related message at a message-center message generator of the service center, the message-center message generator being in communication with the message-center detector to receive an indication of detection of the authorization-station-generated message from the message-center detector in response to detection of the authorization-station-generated message by the message-center detector.*

*32. An apparatus comprising processing circuitry for execution of stored instructions, the execution of which causes the apparatus to:*

*route an electronic receipt evidencing a merchant transaction performed at a merchant transaction station, the electronic receipt to be available at a mobile station operable by a user at least to receive data communicated thereto;*

*support routing of the electronic receipt by detecting a transaction-station-generated message generated by the merchant transaction station regarding a merchant transaction associated with the user or an authorization-station-generated message generated by an authorization station regarding an authorization of a merchant transaction associated with the user, the transaction-station-generated message or the authorization-station-generated message comprising data indicating a financial cost associated with the merchant transaction which is included in the electronic receipt; and*

*support routing of the electronic receipt by generating, in response to detection-of the transaction-station-generated message or the authorization-station-generated message by a message center detector of the apparatus, a transaction-related message for communication to the mobile station, the transaction-related message, once communicated to the mobile station, available thereat as the electronic receipt to the user.*

*33. The apparatus of claim 32, wherein the apparatus includes a service station configured to route the electronic receipt, a message-center detector configured to support routing of the electronic receipt by detecting the transaction-station-generated message or the authorization-station-generated message, and a message-center message generator configured to generate the transaction-related message for communication to the mobile station in response to detection by the message-center detector of the transaction-station-generated message or the authorization-station-generated message.*

* * * * *